(12) United States Patent
Matsuda

(10) Patent No.: US 8,166,202 B2
(45) Date of Patent: Apr. 24, 2012

(54) COMPUTER SUPPORTING REMOTE SCAN

(75) Inventor: Mari Matsuda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 364 days.

(21) Appl. No.: 12/503,529

(22) Filed: Jul. 15, 2009

(65) Prior Publication Data

US 2010/0287306 A1 Nov. 11, 2010

(30) Foreign Application Priority Data

May 11, 2009 (JP) ................................. 2009-114130

(51) Int. Cl.
*G06F 15/173* (2006.01)
(52) U.S. Cl. ......................... 709/242; 709/219; 711/100
(58) Field of Classification Search .................. 709/200, 709/217, 219, 242; 711/100, 163
See application file for complete search history.

(56) References Cited

U.S. PATENT DOCUMENTS

| 6,173,377 | B1 * | 1/2001 | Yanai et al. | 711/162 |
| 7,647,636 | B2 * | 1/2010 | Polyakov et al. | 726/24 |
| 7,895,162 | B2 * | 2/2011 | Tanaka et al. | 707/640 |
| 2006/0112245 | A1 * | 5/2006 | Ikegaya et al. | 711/163 |
| 2007/0055711 | A1 * | 3/2007 | Polyakov et al. | 707/203 |
| 2009/0157583 | A1 * | 6/2009 | Couckuyt et al. | 706/46 |

FOREIGN PATENT DOCUMENTS

JP 2006-146801 6/2006

* cited by examiner

*Primary Examiner* — Moustafa M Meky
*Assistant Examiner* — El Hadji Sall
(74) *Attorney, Agent, or Firm* — Foley & Lardner LLP

(57) ABSTRACT

A computer acquires first connection information related to a path connecting a host computer and a local storage, and acquires second connection information related to a path connecting storage systems. The computer creates route management information based on the connection information. The route management information is information related to a plurality of routes. A single route is configured from two or more nodes connected in series and an inter-node path. The start node of the two or more nodes is a host computer, and the other node of the two or more nodes is a storage system. Based on the route management information, the computer selects, as the host computer for executing a remote scan, the host computer that is the start node of the optimum route from among the plurality of routes having the scan-targeted remote storage as the end node.

15 Claims, 18 Drawing Sheets

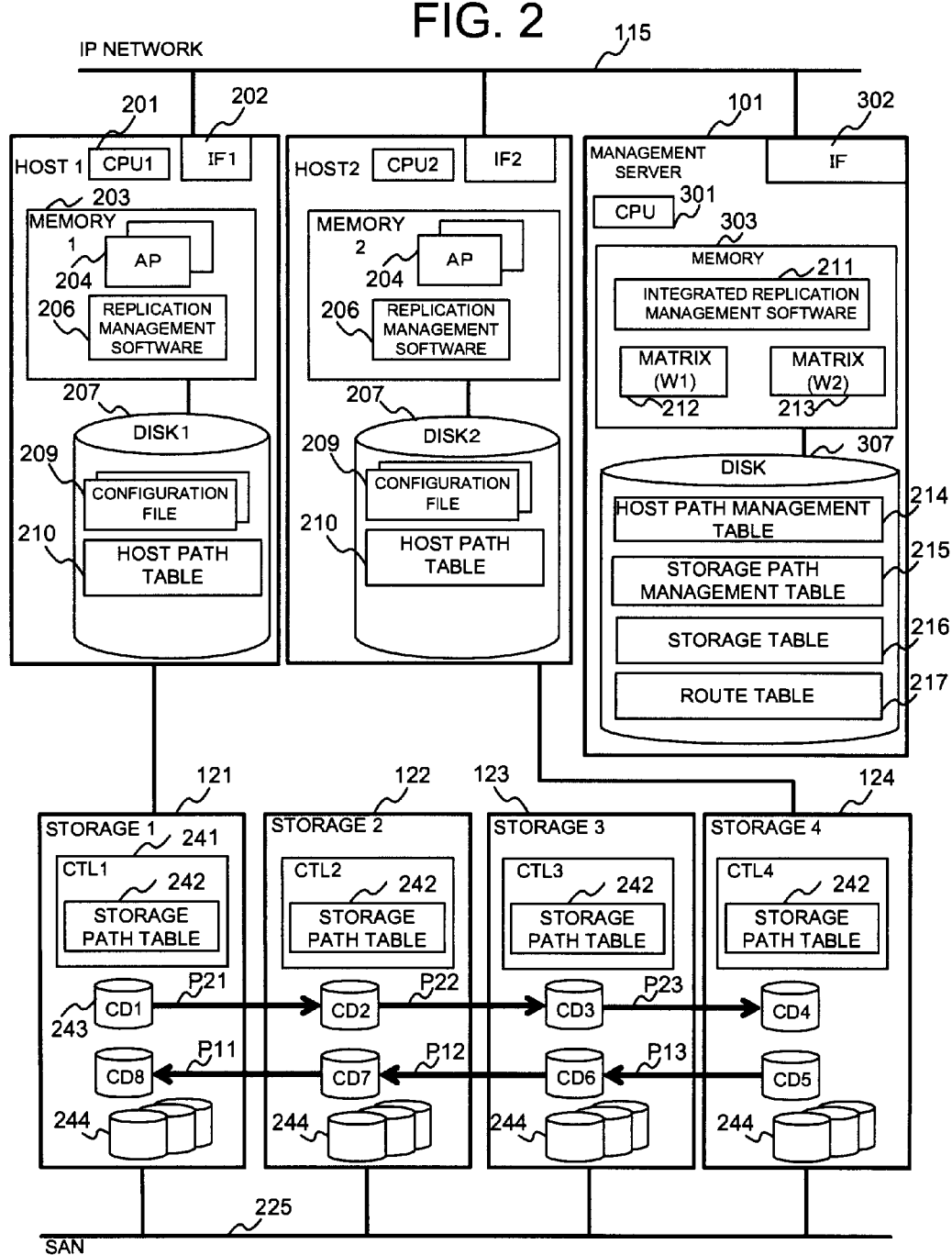

FIG. 3A

STORAGE PATH TABLE 242

| SENDING-SIDE STORAGE NUMBER | SENDING -SIDE CU NUMBER | INITIATOR PORT NUMBER | RECEIVING-SIDE STORAGE NUMBER | RECEIVING -SIDE CU NUMBER | TARGET PORT NUMBER | LINE BANDWIDTH (bit/sec) | DATA AMOUNT (bit/sec) | STATUS |
|---|---|---|---|---|---|---|---|---|
| 14001 | 01 | CL1-A | 14002 | 00 | CL1-B | 5 | 3 | NORMAL |

FIG. 3B

HOST PATH TABLE 210

| HOST NAME | DIRECT-CONNECT STORAGE NUMBER | LINE BANDWIDTH (bit/sec) | DATA AMOUNT (bit/sec) | CPU CYCLE TIME | STATUS |
|---|---|---|---|---|---|
| HostA | 14001 | 3 | 1 | 2ns | NORMAL |

FIG. 4B

STORAGE PATH MANAGEMENT TABLE 215

| SENDING-SIDE STORAGE NUMBER | RECEIVING-SIDE STORAGE NUMBER | LINE BANDWDITH (bit/sec) | DATA AMOUNT (bit/sec) | STATUS |
|---|---|---|---|---|
| 14001 | 14002 | 5 | 3 | NORMAL |
| 14002 | 14001 | 6 | 2 | NORMAL |
| 14002 | 14003 | 6 | 4 | NORMAL |
| 14003 | 14002 | 3 | 1 | NORMAL |
| 14003 | 14004 | 3 | 1 | NORMAL |
| 14004 | 14003 | 4 | 2 | NORMAL |

FIG. 4C

STORAGE TABLE

| NODE ID | STORAGE NUMBER |
|---|---|
| 1 | 14001 |
| 2 | 14002 |
| 3 | 14003 |
| 4 | 14004 |

MATRIX (W1)

| j \ i | 1 | 2 | 3 | 4 | 5 | 6 |
|---|---|---|---|---|---|---|
| 1 | ∞ | 1 | ∞ | ∞ | 1 | ∞ |
| 2 | 1 | ∞ | 1 | ∞ | ∞ | ∞ |
| 3 | ∞ | 1 | ∞ | 1 | ∞ | ∞ |
| 4 | ∞ | ∞ | 1 | ∞ | ∞ | 1 |
| 5 | 1 | ∞ | ∞ | ∞ | ∞ | ∞ |
| 6 | ∞ | ∞ | ∞ | 1 | ∞ | ∞ |

FIG. 5B

MATRIX (W2)

| j \ i | 1 | 2 | 3 | 4 | 5 | 6 |
|---|---|---|---|---|---|---|
| 1 | ∞ | 3/5 | ∞ | ∞ | 1/3 | ∞ |
| 2 | 2/6 | ∞ | 4/6 | ∞ | ∞ | ∞ |
| 3 | ∞ | 1/3 | ∞ | 1/3 | ∞ | ∞ |
| 4 | ∞ | ∞ | 2/4 | ∞ | ∞ | 3/4 |
| 5 | 1/3 | ∞ | ∞ | ∞ | ∞ | ∞ |
| 6 | ∞ | ∞ | ∞ | 3/4 | ∞ | ∞ |

FIG. 6

ROUTE TABLE 217

| END-NODE ID | START-NODE ID | ROUTE DISTANCE | ROUTE LOAD | ROUTE LIST |
|---|---|---|---|---|
| 1 | 5 | 1 | 1/3 | null |
| 1 | 6 | 4 | 23/12 | 14004→14003→14002→14001 |
| 2 | 5 | 2 | 14/15 | 14001→14002 |
| 2 | 6 | 3 | 19/12 | 14004→14003→14002 |
| 3 | 5 | 3 | 8/5 | 14001→14002→14003 |
| 3 | 6 | 2 | 5/4 | 14004→14003 |
| 4 | 5 | 4 | 29/15 | 14001→14002→14003→14004 |
| 4 | 6 | 1 | 3/4 | null |

COMPUTER SUPPORTING REMOTE SCAN

CROSS-REFERENCE TO PRIOR APPLICATION

This application relates to and claims the benefit of priority from Japanese Patent Application Number 2009-114130, filed on May 11, 2009 the entire disclosure of which is incorporated herein by reference.

BACKGROUND

The present invention generally relates to technology for acquiring information related to a scan-targeted logical volume from any of a plurality of storage systems connected in series.

Technology for acquiring information related to a scan-targeted logical volume from any of a plurality of storage system connected in series, for example, includes the technologies disclosed in Japanese Patent Application Laid-open No. 2006-146801 and the Specification of Unexamined US Patent Application No. 2006/0112245.

SUMMARY

In the following explanation, a storage system that is connected to at least one host computer will be called a "local storage", and a storage system that is not connected to any host computer will be called a "remote storage". Further, a host computer and a storage system may be referred to generically as a "node".

In technology of this kind, a plurality of storage systems will generally comprise two or more local storages and one or more remote storages. A scan command for acquiring information (referred to as scan result information below) related to a scan-targeted logical volume is issued from any of the host computers.

If the scan-targeted storage system is the local storage connected to this host computer, the scan result information is sent from this local storage to this host computer.

By contrast, if the scan-targeted storage system is any of the remote storages, the scan command reaches the scan-targeted remote storage by passing in order through one or more storage systems from the local storage that received this scan command. Then, the scan result information is sent from this remote storage. The sent scan result information reaches the host computer that issued the scan command via the local storage after passing in reverse order through the above-mentioned one or more storage systems. The acquiring of the above-mentioned scan result information from the remote storage will be called a "remote scan" below.

There may be a case where the local storages are connected to the scan-targeted remote storage either directly or by way of at least one storage system. In this case, it is possible to acquire the scan result information from the scan-targeted remote storage even when a remote scan command is issued from any of two or more host computers.

In this case, the user will select the host computer that is to issue the remote scan command. Normally, the user does not know the inter-node connection configuration (that is, he does not know which host computer is connected to which storage system, or which storage system is connected to which other storage system). For this reason, it is impossible to select the optimum host computer for issuing the remote scan command.

Accordingly, an object of the present invention is to increase the probability of being able to select the optimum host computer for issuing a remote scan command.

A computer that is connected to the communication network to which the plurality of host computers are connected executes a route check process and a scan process. This computer may be any one of the plurality of host computers. This computer may also be a single computer, or it may be configured from a plurality of computers.

The above-mentioned route check process comprises:

(a1) a process for acquiring host/storage connection information related to a host path, which is the path connecting the host computer to the local storage;

(a2) a process for acquiring, via the respective host computers, storage/storage connection information related to a storage path, which is the path connecting a storage system to a storage system; and (a3) a process for creating route management information based on the host/storage connection information and the storage/storage connection information, and storing the created route management information. The route management information is information related to a plurality of routes. One route is comprised from two or more nodes connected in series, and an inter-node path. The start node of the two or more nodes is any of the host computers, and the other node of these two or more nodes is any of the storage systems.

The above-mentioned scan process comprises:

(b1) a process for specifying, from the route management information, a plurality of routes having, as an end node, a scan-targeted storage system of the plurality of storage systems configuring one or more storage cascades; and (b2) a process for selecting, based on the route management information, the host computer, which is the start node of an optimum route of the above-mentioned plurality of routes, as the host computer for executing a remote scan in a case where it is found in the above-mentioned process (b1) that the scan-targeted storage system is any of the remote storages. In the scan process, the computer may also order the host computer selected in the above-mentioned (b2) to perform a remote scan.

In the above-mentioned (b2), the computer may select this host computer without displaying information denoting the host computer that is the optimum route start node, or the computer may display this information and select this host computer in response to having received a specification for this host computer from the user.

BRIEF DESCRIPTION OF THE DRAWINGS

FIG. 2 shows the configuration of a host computer according to an embodiment of the present invention;

FIG. 3A shows a storage path table 242;

FIG. 3B shows a host path table 210;

FIG. 4B shows a storage path management table 215;

FIG. 4C shows a storage table 216;

FIG. 5A shows a matrix (W1) 212;

FIG. 5B shows a matrix (W2) 213;

FIG. 6 shows a route table 217;

DETAILED DESCRIPTION OF THE EMBODIMENTS

Figure 1:
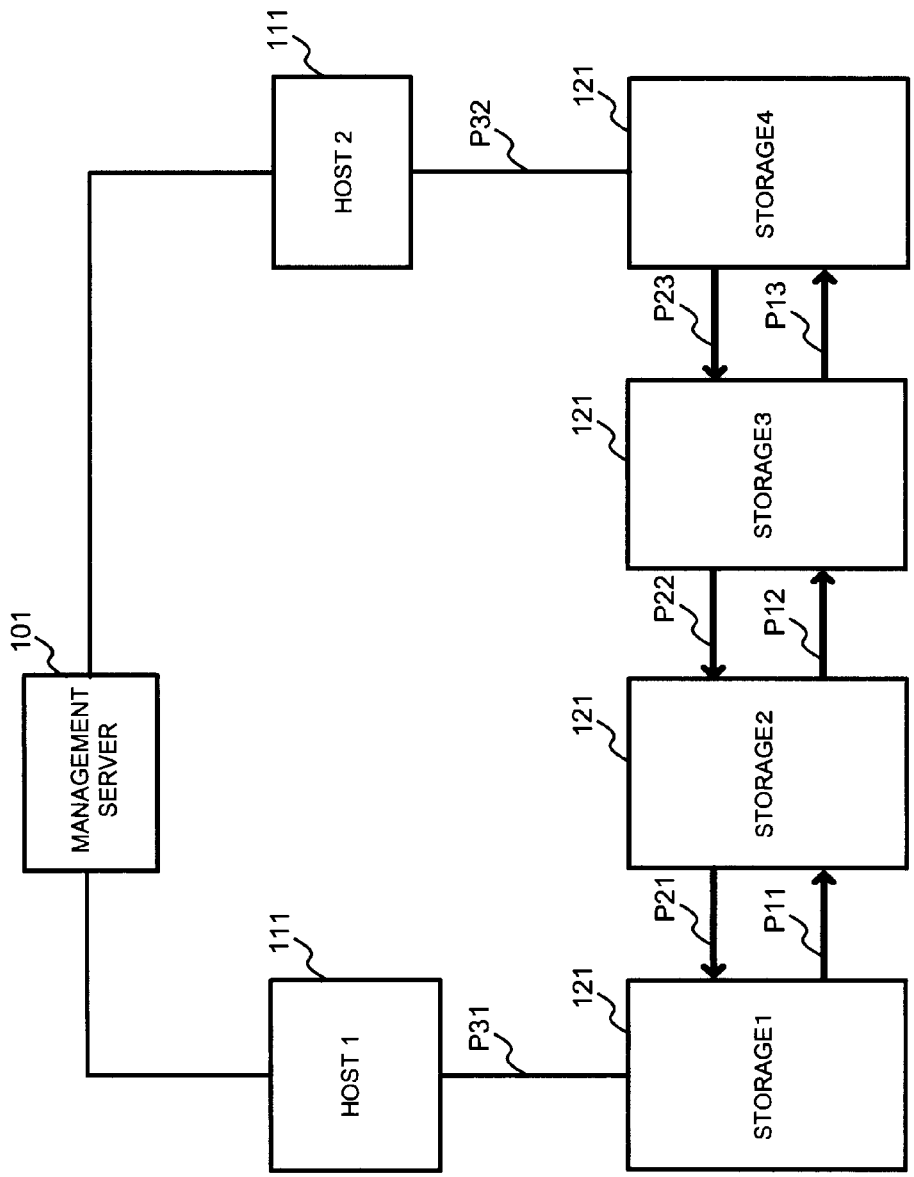
FIG. 1 shows an overview of a computer system according to an embodiment of the present invention.

FIG. 1 shows an overview of a computer system according to an embodiment of the present invention.

There are two host computers 111. These two host computers 111 will be designated below as "host 1" and "host 2", respectively. Further, when no particular distinction is made between these hosts, they may also be referred to generically as the "host".

A management server 101 is connected to the hosts 1 and 2. However, in a case where the functions of the management server 101 have been provided in either of hosts 1 or 2, the management server 101 does not necessarily have to be used.

There is one storage cascade. This storage cascade is configured from four storage systems 121 connected in series. These four storage systems will respectively be called "storage 1", "storage 2", "storage 3" and "storage 4" below. Further, when no particular distinction is made between these storage systems, they may also be referred to generically as the "storages". A host and a storage may be referred to generically as a "node".

Of the storages 1 through 4, the host 1 is directly connected to the storage 1 via a host path P31, and the host 2 is directly connected to the storage 4 via a host path P32. For this reason, the storages 1 and 4, respectively, are local storages, and the storages 2 and 3, respectively, are remote storages. Furthermore, in this embodiment, "directly connected" signifies being connected without going through any node (either a host or a storage). Further, a "host path" is a path that connects a host to a storage.

The direction of a storage path, which is the path connecting storages, is defined beforehand. According to FIG. 1, a first storage path P11, P12 or P13, which is a path in the direction (a first direction) from the storage 1 to the storage 4, and a second storage path P23, P22 or P21, which is a path in the direction (a second direction) from the storage 4 to the storage 1, have been defined beforehand for each pair of storages. The scan command is transferred along the direction of the storage path. Another type of command besides a scan command is also transferred along the direction of the storage path. For example, in a case where the host 1 sends an I/O command (either a write command or a read command) that specifies a logical volume inside the storage 2, this I/O command is transferred to the storage 2 by way of the storage 1 and the first storage path (P11).

Each host stores the host/storage connection information related to the host path connecting this host to the local storage. For example, the host/storage connection information maintained by the host 1 comprises information denoting the storage 1, which is directly connected to the host 1. Specifically, the host/storage connection information, for example, is the host path table 210, which will be described further below (refer to FIGS. 2 and 3B).

Each storage maintains the storage/storage connection information related to the storage path that connects the respective storages. For example, the storage/storage connection information maintained in the storage 2 comprises information denoting the storages 1 and 3, which are directly connected to the storage 2. Specifically, the storage/storage connection information, for example, is the storage path table 242, which will be described further below (refer to FIGS. 2 and 3A).

In this embodiment, the management server 101 acquires the host/storage connection information and the storage/storage connection information, and based on this information, creates the route management information. The route management information is information related to all the existing routes. Therefore, it is possible to discern which host is connected to which storage, and which storage is connected to which other storage. Furthermore, one route is configured from two or more nodes connected in series and an inter-node path, the start node of these two or more nodes is any of the hosts, and the other node of these two or more nodes is any of the storages. For example, the route that has the storage 3 as the end node includes two routes. The first route is a first direction route, that is, the route comprising the host 1, the host path P31, the storage 1, the first storage path P11, the storage 2, and the first storage path P12. The second route is a second direction route, that is, the route comprising the host 2, the host path P32, the storage 4, and the second storage path P23.

The management server 101 acquires the storage/storage connection information from all the storages via the respective hosts. At this time, the storage/storage connection information is acquired along both of the directions, i.e. the first direction and the second direction. Specifically, for example, the management server 101 acquires the storage/storage connection information from the storage 1 via the host 1, then acquires the storage/storage connection information from the storage 2 specified from this information via the host 1 and the storage 1, next, collects the storage/storage connection information from the storage 3 specified from this information via the host 1, the storage 1 and the storage 2, and finally acquires the storage/storage connection information from the storage 4 specified from this information via the host 1, the storage 1, the storage 2 and the storage 3. In a similar method, the management server 101 acquires the storage/storage connection information from the storage 2 specified from the storage 4 via the host 2, and thereafter, acquires the storage/storage connection information from the storage 3, the storage 2 and the storage 1 in that order via the host 2.

The route management information, for example, is a route table 217, which will be explained further below (refer to FIGS. 2 and 6). The management server 101, based on the route management information, specifies the optimum route of the plurality of routes that have the scan-targeted remote storage as the end node, and selects the start node host of the optimum route. Then, the management server 101 causes this host to execute a remote scan (acquire information related to the scan-targeted logical volume from the scan-targeted remote storage). For example, in a case where the scan-targeted remote storage is storage 3, the two routes described above both have the storage 3 as the end node, but of the two routes, the distance of the second direction route is shorter than the first direction route distance, and for this reason, the management server 101 selects the host 2, which is the start node of the second direction route, and causes the host 2 to execute the remote scan.

Furthermore, "route distance" as used here is the number of inter-node hops (the number of hops) between the start node and the end node. The greater the number of hops the longer the distance, and the fewer the number of hops the shorter the distance. The number of hops becomes smaller the fewer the number of nodes that exist between the start node and the end node (referred to as the intermediate nodes below), and becomes larger the greater the number of intermediate nodes. The number of hops is the number of intermediate nodes+1.

Although not possible for the configuration example shown in FIG. 1, in a different configuration example it may be possible to have two or more routes of the same distance among the plurality of routes having the scan-targeted remote storage as the end node. In accordance with this, the management server 101 specifies the route with the minimum load from among these two or more routes, and selects the start node host of the route with the minimum load. The load of each route, as will be described further below, is computed based on line bandwidth and amount of data per unit of time (for example, one second).

Furthermore, in a case where there are two or more routes with the minimum load, the management server 101 selects the host with the minimum load from among the two or more hosts corresponding to the two or more minimum load routes. The host load is specified based on the operational status of the host's resources. For example, a CPU clock cycle time and a memory utilization rate may be used as resource operational statuses, and in this embodiment, the CPU clock cycle time is employed.

In this embodiment, in a case where there are two or more minimum load routes, the host is selected on the basis of the host load, but either instead of or in addition thereto, the load of a different node (for example, the load of the local storage) may also be taken into account. For example, the load may be specified for each set of a host and a local storage directly connected to this host (a host/local storage set), and the host that belongs to the host/local storage set having the smallest load may be selected.

In this embodiment, of the route distance, the route load and the node load, top priority is given to the route distance, followed by the route load, but the order of preference does not have to be limited to this (for example, the route load may be given top priority). Or, at least two of the three elements (route distance, route load and node load) may be taken into account at all times. Specifically, for the plurality of routes having the scan-targeted remote storage as the end node, at least two elements of the following three elements may be taken into account at all times:

(x1) route distance difference;
(x2) route load difference; and
(x3) node (for example, host) load difference.

For example, in a case where the first route is shorter than the second route, but the difference between these distances is less than a predetermined value, and the load of the first route is a predetermined value that is larger than that of the second route, the second route may be selected.

Figure 16:
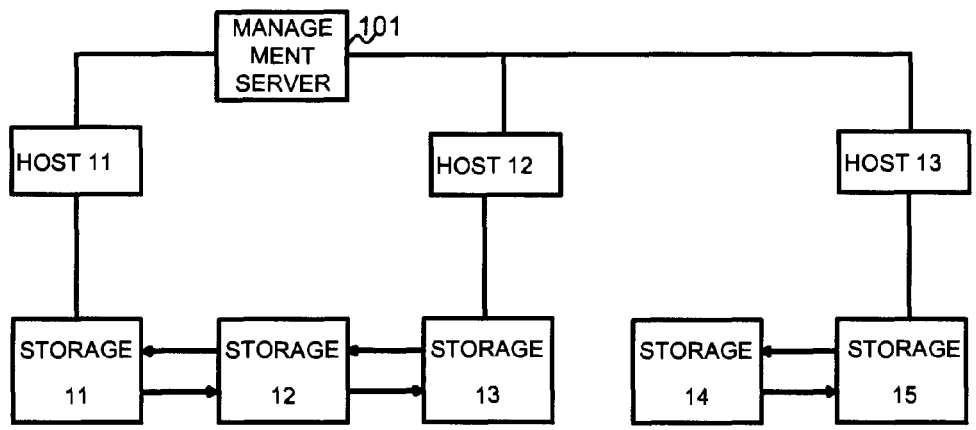
FIG. 16 shows an overview of one example of a computer system comprising a plurality of storage cascades.

The host that is ordered to execute the remote scan issues a remote scan command. In response to this remote scan command, the scan result information related to the scan-targeted logical volume is received from the scan-targeted remote storage. The management server 101, based on the route management information, specifies the start node host of all the routes having the scan-targeted remote storage as the end node (except for the host that originally issued this remote scan command). Then, the management server 101 sends the scan result information to the specified host. For example, according to the configuration example shown in FIG. 1, the scan result information will be sent to either one of hosts 1 or 2 regardless of which storage is the target of the scan. In the case of a different configuration example, for instance, in the configuration example shown in FIG. 16, in which the remote scan command is sent from the host 11 to the scan-targeted storage 12, the management server 101 sends the scan result information to the host 12, but does not send this information to the other host 13. This is because the only host other than the host 11 on the route having the storage 12 as the end node is the host 12. Furthermore, "sending scan result information" may refer to sending the scan result information itself, which was acquired from the storage, or may refer to sending system configuration information (information denoting which logical volumes exist in which storage systems, for example, a configuration file 209, which will be explained further below (refer to FIG. 2)), which has been updated based on this scan result information. Furthermore, the reason for sending the scan result information to the other host is so the other host will have the scan result information and be able to continue processing a task in a case where it becomes impossible to use a certain host (in other words, with disaster recovery in mind).

The preceding has been an overview of this embodiment. A detailed explanation of this embodiment will be given below.

FIG. 2 shows the configuration of a computer system according to an embodiment of the present invention.

The hosts 1 and 2 and the management server 101 are connected to an IP (Internet Protocol) network 115. The storages 1 through 4 are connected to a SAN (Storage Area Network) 225. At least one of the IP network 115 and the SAN 225 may be a different type of network. The hosts 1 and 2, the management server 101 and the storages 1 through 4 may also be connected to a common network. For example, the hosts 1 and 2 may be connected to the SAN 225.

The hosts 1 and 2 will be explained by giving the host 1 as a representative example.

The host 1 has an IF 202, a storage resource, and a CPU 201 that interconnects these. The storage resource, for example, is a memory 203 and a disk 207.

The IF 202 is a network interface for carrying out communications over the IP network 115.

The memory 203 stores computer programs that are executed by the CPU 201, for example, an operating system (not shown in the drawing), an AP (application program) 204 and replication management software 206.

The disk 207 is a disk-type storage device, for example, a hard disk device. The disk 207 stores a configuration file 209 and a host path table 210.

The management server 101 has an IF 302, a storage resource, and a CPU 301 that interconnects these. The storage resource, for example, is a memory 303 and a disk 307.

The IF 302 is a network interface for carrying out communications over the IP network 115.

The memory 303 stores computer programs that are executed by the CPU 301, for example, an operating system (not shown in the drawing) and integrated replication management software 211. The memory 303 also stores a matrix (W1) 212 and a matrix (W2) 213.

The disk 307 is a disk-type storage device, for example, a hard disk device. The disk 307 stores a host path management table 214, a storage path management table 215, a storage table 216, a route table 217 and a configuration file 209. The configuration file 209 is the same as the configuration file 209 of the hosts 1 and 2. The configuration file 209 is either created or updated based on the scan result information, and, for example, describes information denoting which storage has which logical volume.

The storages 1 through 4 will be explained by giving the storage 1 as a representative example.

The storage 1 has a controller (referred to as CTL below) 241, and a plurality of logical volumes (referred to as VOL below).

The CTL 241 has a plurality of ports, a CPU and a memory. The CTL 241 accesses the VOL specified by a received I/O command from the host, either directly or via another storage. The memory inside the CTL 241 stores a storage path table 242.

Each VOL is either a virtual VOL or a real VOL. A real VOL is formed on the basis of a RAID (Redundant Array of Independent (or Inexpensive) Disks) group. The RAID group stores data at a predetermined RAID level. The RAID group is configured from a plurality of physical storage devices (for example, hard disk drives or flash memories).

The plurality of VOL comprise a host VOL and a command device (abbreviated as "CD" in FIG. 2).

The host VOL is able to be specified from the host using an I/O command.

The command device is a VOL for command control use. A variety of commands, for example, a command for specifying another VOL inside the storage having this command device, and a command for another storage are stored in this command device. In this embodiment, a command device for a first direction (the direction from the storage 1 to the storage 4) and a command device for a second direction (the direction from the storage 4 to the storage 1) are provided in a single storage. In the example of FIG. 2, the first direction command devices in the storages 1 through 4 are the command devices 1 through 4, and the second direction command devices are the command devices 5 through 8.

In each storage, a physical path and a logical path are set between a command device and a command device.

Figure 17:
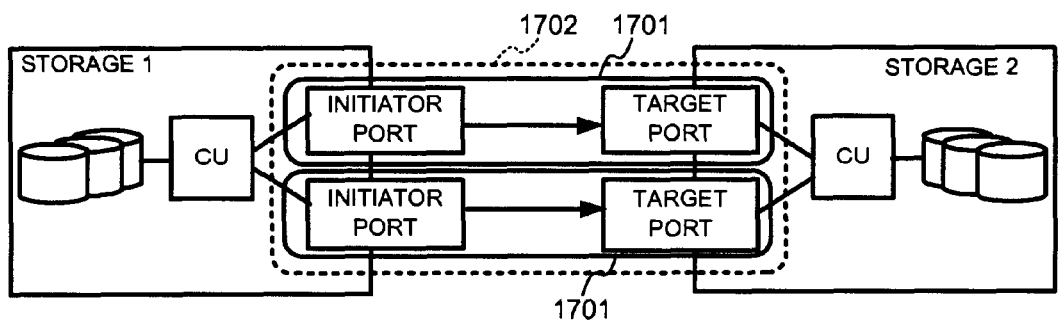
FIG. 17 is a schematic diagram of a storage path.

The "logical path", as shown in FIG. 17, is a communication path 1702 virtually established on either one or a plurality of physical paths 1701. A single logical path may have up to a maximum of eight physical paths. The "physical path" is synonymous with a line. The physical path is the path from the port (initiator port) associated to the CU (Control Unit) inside the sending-side storage to the port (target port) associated to the CU inside the receiving-side storage (these ports are interconnected, for example, by a fiber channel cable). The "CU" is an element that has been made correspondent to a VOL, and the VOL that corresponds to the CU is a group of a plurality of logical storage devices.

The logical path between the command devices is either a dedicated command device logical path or a logical path for copying. Since communications between command devices is unidirectional, two command devices and logical paths, respectively, are set to carry out two-way communications between two storages. In FIG. 2, the logical path and its direction are depicted by an arrow shown between command devices and the direction thereof.

In this embodiment, the load of the storage path (the logical path) is determined based on the bandwidth of the physical path (line) and the amount of data per unit of time between the command devices. If a single logical path has a plurality of physical paths, computing the load of the storage path takes into account the physical path bandwidth and the amount of data per unit of time of at least one of the plurality of physical paths. For example, an average value of the bandwidths and the data amounts of the plurality of physical paths may be used, or the bandwidth and the amount of data of the physical path for which the value obtained by dividing the data amount by the bandwidth is the smallest (that is, the physical path with the smallest load) may be used.

The replication management software 206 of the host has the following functions:

(1) Copy operation (function for creating a VOL pair and changing the status of the VOL pair);

(2) Copy group operation (function for grouping together a plurality of VOL and executing an operation in group units);

(3) Volume scan (function for acquiring VOL-related information from the storage);

(4) Remote storage control (function for controlling (operating) the remote storage); and (5) Logical path control (function for establishing and deleting the storage path).

The volume scan, for example, is needed for defining the copy group. The scan result information is stored in the configuration file 209. The VOL pair and the VOL pair group are created based on the VOL information (which storage has which VOL) stored in the configuration file 209. There are two types of volume scans: a local scan and a remote scan.

The local scan is a volume scan in which the local storage is the scan target. That is, the scan result information is acquired from the local storage.

The remote scan is a volume scan in which the remote storage is the scan target. The above-mentioned storage path setting is needed to transfer a remote scan command for a remote scan. For the remote scan operation, the user, for example, inputs the remote storage serial number, the range of VOL to be scanned (for example, a range of VOL numbers) and a route list. The route list is the transfer route of the remote scan command, and denotes which storage is passed through in which order. For example, the route list 14001→14002→14003 (list of serial numbers) signifies the transfer route storage 1→storage 2→storage 3. For this reason, the remote scan command comprising this route list reaches the remote storage 3 by way of the local storage 1 and the remote storage 2. Specifically, this remote scan command is processed in the following order.

The CTL 1 inside the local storage 1 receives the remote scan command from the host 1, and stores this remote scan command in the command device 1. The CTL 1 transfers this remote scan command from the command device 1 to the remote storage 2 by way of the storage path P11 in accordance with the route list inside this remote scan command. The CTL 2 inside the remote storage 2 receives the remote scan command by way of the storage path P11, and stores this command in the command device 2. The CTL 2 transfers this remote scan command from the command device 2 to the remote storage 3 by way of the storage path P12 in accordance with the route list inside this remote scan command. The CTL 3 inside the remote storage 3 receives the remote scan command by way of the storage path P12, and stores this command in the command device 3.

The CTL 3 references the remote scan command inside the command device 3, acquires the information related to the VOL belonging to the VOL range specified by this command, and sends the scan result information (volume information) comprising this information. This scan result information reaches the host 1 by way of the storages in the reverse order of that of the remote scan command transfer route. Specifically, for example, the scan result information reaches the host 1 by way of the storage path P22, the storage 2, the storage path P21 and the local storage 1. The replication management software 206 inside the host 1 stores this scan result information in the configuration file 209. Further, this replication management software 206 also sends the scan result information (for example, the post-update configuration file 209) to the management server 101. The integrated replication management software 211 inside the management server 101 sends this scan result information to the host 2. The replication management software 206 inside the host 2 stores this scan result information (for example, creates and either updates or stores the configuration file 209).

The tables of the storage, the host and the management server will be explained in detail below.

FIG. 3A shows a storage path table 242 of the storage.

The storage path table 242 is a table in which information related to the storage path is described. Storage path-related information in which the storage having this table 242 is the sending-side storage is described in this table 242. The table 242 shown in FIG. 3A is an example of the table 242 of the storage 1, which is at one end of the storage cascade. For this reason, only one storage path is described, but information concerning the storage paths of both the first direction and the second direction is described in the table 242 of the storage that is not at the end of the storage cascade, such as storages 2 and 3.

The table 242 has the following information elements for a single storage path:
  (1) Sending-side storage number (the serial number of the sending-side storage);
  (2) Sending-side CU number (CU number of sending-side storage);
  (3) Initiator port number;
  (4) Receiving-side storage number (the serial number of the receiving-side storage);
  (5) Receiving-side CU number (CU number of receiving-side storage)
  (6) Target port number;
  (7) Line bandwidth (bandwidth of the physical path of the storage path);
  (8) Amount of data (the amount of data that flows over the physical path of the storage path per second); and
  (9) Status (the status of the storage path, for example, normal or failure).

If a single storage path has a plurality of physical paths, for example, the above-mentioned information components (3), (6), (7), (8) and (9) exist for each physical path.

FIG. 3B shows the host path table 210 of the host.

The host path table 210 is a table in which information related to the host path is described. This table 210 has the following information elements:
  (1) Host name (the name of the host that has this table 210);
  (2) Direct-connect storage number (the serial number of the local storage that is directly connected to this host);
  (3) Line bandwidth (the bandwidth of the data path);
  (4) Amount of data (the amount of data flowing over the host path per second);
  (5) CPU cycle time (the cycle time of the CPU of this host); and
  (6) Status (the status of the host path, for example, normal or failure).

Figure 4A:
FIG. 4A shows a host path management table 214.

FIG. 4A shows the host path management table 214 of the management server 101.

The host path management table 214 describes information related to all the host paths that are detected. This table 214 has the following information elements for a single host path:
  (1) Node ID (the host ID);
  (2) Host name (the name of the host);
  (3) Direct-connect storage number (the serial number of the local storage that is directly connected to this host);
  (4) Line bandwidth (the bandwidth of the host path);
  (5) Amount of data (the amount of data flowing over the host path per second);
  (6) CPU cycle time (the cycle time of the CPU of this host); and
  (7) Status (the status of the host path, for example, normal or failure).

The host path table 242 information acquired from the host is described in this table 214.

FIG. 4B shows the storage path management table 215 of the management server 101.

The storage path management table 215 describes information related to all the storage paths that are detected. This table 215 has the following information elements for a single storage path:
  (1) Sending-side storage number (the serial number of the sending-side storage);
  (2) Receiving-side storage number (the serial number of the receiving-side storage);
  (3) Line bandwidth (bandwidth of the physical path of the storage path);
  (4) Amount of data (the amount of data that flows over the physical path of the storage path per second); and
  (5) Status (the status of the storage path, for example, normal or failure).

The storage path table 210 information acquired from the storage through the host is described in this table 215.

FIG. 4C shows the storage table 216 of the management server 101.

The storage table 216 describes information related to the storage that has been detected. Specifically, for example, the node ID and storage number (serial number of the storage) are described in this table 216 for each storage.

FIG. 5A shows the matrix (W1) 212 created in the management server 101.

The matrix (W1) 212 is for showing which node (host or storage) is directly connected to which node. The matrix (W1) 212 is created in the midst of scan processing, which will be explained further below.

The vertical axis number [i] and the horizontal axis number [j] are the numbers allocated to the node (the node ID in this embodiment). In FIG. 5A (and in FIG. 5B, which will be explained further below), the nodes [1] through [4] correspond to the storages 1 through 4, and the nodes [5] and [6] correspond to the hosts 1 and 2.

The existence of a path (connection) from node [i] to node [j] may be annotated below as "W1[i][j]". W1[i][j]=1 signifies that there is a direct connection from node [i] to node [j]. By contrast, W1[i][j]=∞ signifies that there is not a direct connection from node [i] to node [j]. For example, according to the matrix in FIG. 5A, node [i=2] (storage 2) is directly connected to node [i=3] (storage 3), and is also directly connected to node [i=1] (storage 1).

FIG. 5B shows the matrix (W2) 213 created in the management server 101.

The matrix (W2) 213 denotes the inter-node load. The configuration of this matrix is the same as that of matrix (W1) 212. That is, the vertical axis number [i] and the horizontal axis number [j] are the numbers allocated to the node. The matrix (W2) 213 is also created in the midst of scan processing, which will be explained further below.

"Load" here is the value obtained by computing the data amount÷the bandwidth. The load of the path from node [i] to node [j] may be annotated as "W2[i][j]". The value of W2[i][j] is computed by the data amount÷the bandwidth for the path from the node [i] to the node [j]. Specifically, for example, W2[1][2] is the load of the path from the storage 1 to the storage 2, and this load is "3/5". This is because, according to the first row of the table 215 shown in FIG. 4B, the bandwidth for this path is "5" and the data amount is "3".

Furthermore, W2[i][j]=∞ signifies that there is no path from the node [i] to the node [j].

FIG. 6 shows the route table 217 of the management server 101.

The route table 217 describes information related to the route. The configuration of the route (which path leads from which node to which node) is specified based on the host path management table 214 and the storage path management table 215. This table 217 has the following information elements for a single route:

(1) End-node ID (the node ID of the end node of the route);
(2) Start-node ID (the node ID of the start node of the route);
(3) Route distance (number of hops);
(4) Route load; and
(5) Route list (the order in which the storages are passed through).

The route load is computed based on either the load of all the paths of the route (the data amount÷the lines), or the load of a specified path of the route.

This table 217 clarifies the following items.

For example, in a case where the start node is the node 5 (host 1), and the end node (the scan-targeted storage) is the node 1 (storage 1), since the end node is the local storage, the number of hops is 1. Also, since there is no need for the scan command to be transferred between storages, valid information is not set for the route list (null).

Further, for example, in a case where the start node is the node 6 (host 2) and the end node (the scan-targeted storage) is the node 3 (storage 3), since the command reaches the storage 4 from the host 2, and thereafter reaches the storage 3 from the storage 4 (that is, since the number of intermediate nodes is 1), the number of hops is 2.

The processing carried out by this embodiment will be explained below by referring to the flowcharts.

Figure 7:
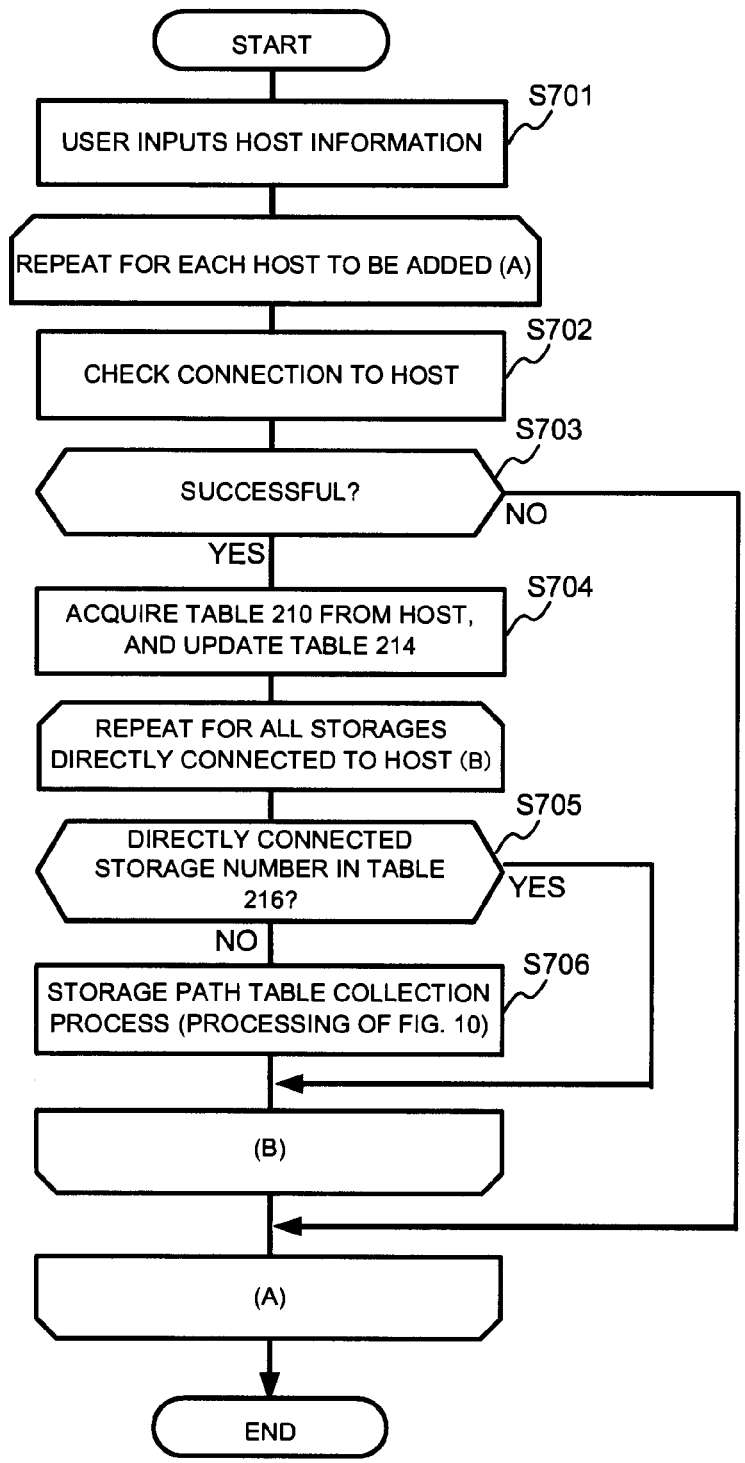
FIG. 7 is a flowchart of a host addition process.

FIG. 7 is the flowchart of a host addition process.

The host addition process is executed when a host is added.

In S701, the integrated replication management software 211 receives an input of information (for example, an IP address) related to all the hosts to be added from the user. Furthermore, the information sent from the user to the software 211 may be inputted using a management server 101 provided input device, and may also be inputted from a remote user terminal.

The following S702 through S706 are carried out for each added host. S702 through S706 will be explained below giving a single host (called the "target host" in the explanations of FIGS. 7 and 10) as an example.

In S702, the software 211 uses the information inputted from the user to check the connection to the target host.

In S703, the software 211, based on the result of this connection check, determines whether or not the connection was successful. If the determination is that the connection was successful (S703: YES), S704 is carried out.

In S704, the software 211 acquires the host path table 210 from the target host, and, on the basis of the information in this table 210, updates the host path management table 214. For example, the information in the table 210 is added to the table 214, and the node ID allocated to the target host is also added to the table 214.

S705 and S706 are performed for all the local storages directly connected to the target host.

In S705, the software 211 determines whether or not the storage number of the local storage directly connected to the target host is registered in the storage table 216. S706 is performed only when the result of this determination is negative (S705: NO).

Figure 10:
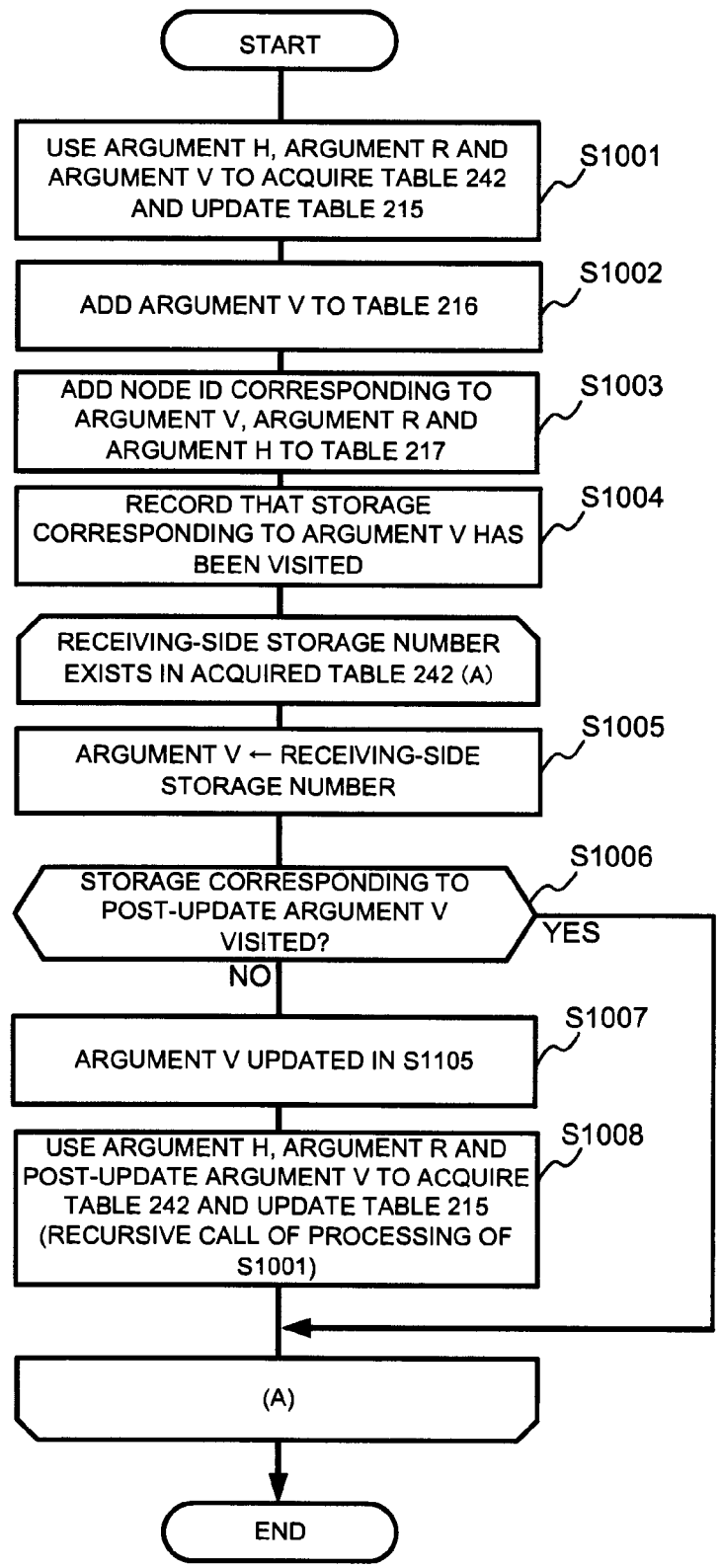
FIG. 10 shows the flowchart for a storage path table collection process.

In S706, the software 211 executes the processing of FIG. 10 (a storage path table collection process). In accordance with this, the storage table 216 and the storage path management table 215 are updated.

Figure 8:
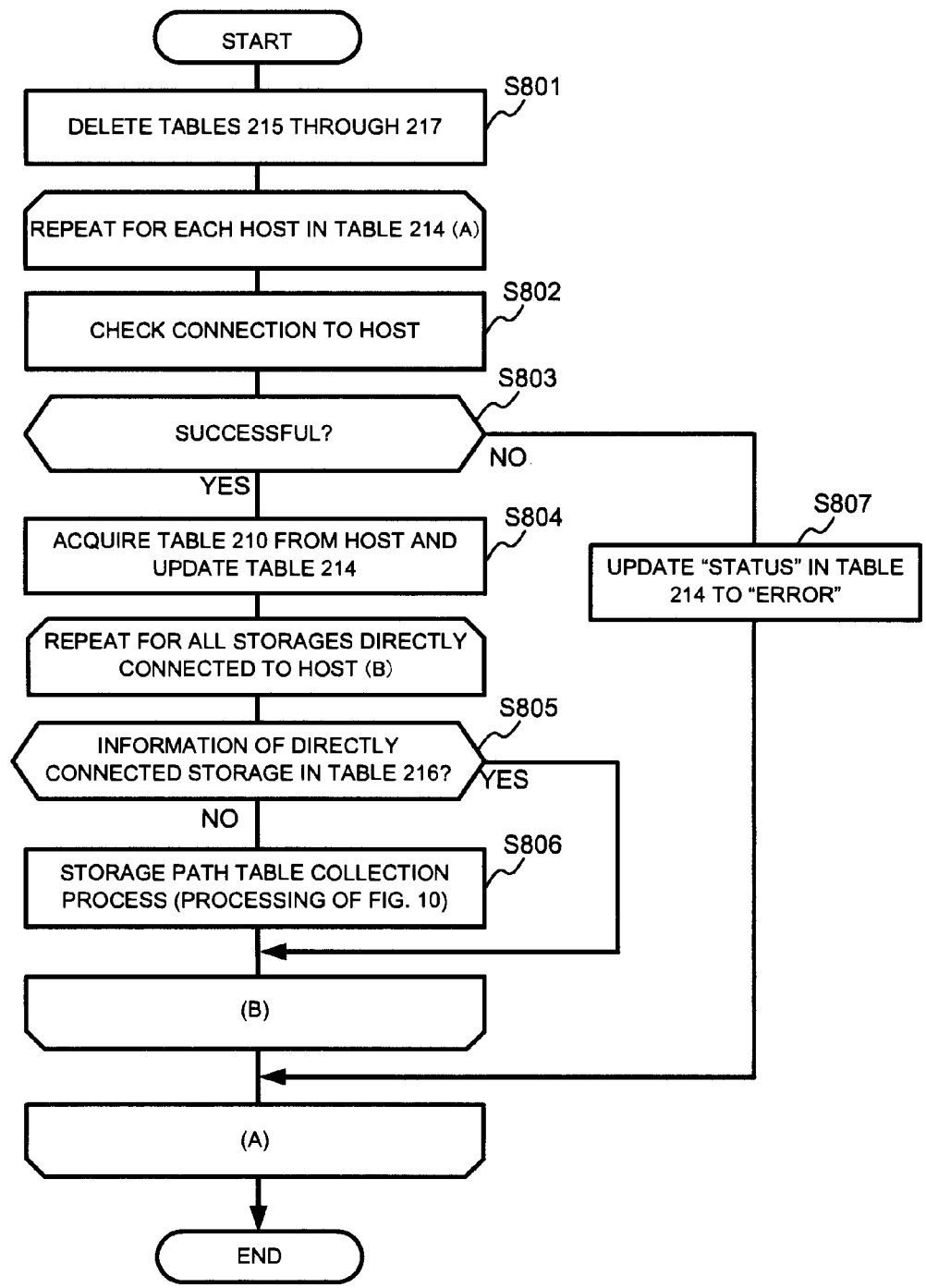
FIG. 8 is a flowchart of a configuration change process.

FIG. 8 is a flowchart of a configuration change process.

The configuration change process is carried out either when a configuration change (for example, the addition or deletion of a path) is made, or when paths' loads are acquired.

In S801, the integrated replication management software 211 deletes the storage path management table 215, the storage table 216, and the route table 217.

The following S802 through S807 are carried out for each host for which information has been registered in the host path management table 214. S802 through S807 will be explained hereinbelow giving a single host (called the "target host" in the explanations of FIGS. 8 and 10) as an example.

In S802, the software 211 checks the connection to the target host.

In S803, the software 211, based on the result of this connection check, determines whether or not the connection was successful. If the determination is that the connection was successful (S803: YES), S804 is carried out, and if the determination is that the connection failed (S803: NO), S807 is carried out.

In S804, the software 211 acquires the host path table 210 from the target host, and, on the basis of the information in this table 210, updates the host path management table 214.

S805 and S806 are performed for all the local storages directly connected to the target host.

In S805, the software 211 determines whether or not the storage number of the local storage directly connected to the target host is registered in the storage table 216. S806 is performed only when the result of this determination is negative (S805: NO).

In S806, the software 211 executes the processing of FIG. 10 (the storage path table collection process). In accordance with this, the storage table 216 and the storage path management table 215 are updated.

In S807, the software 211 updates the value of the "status" corresponding to the target host in the host path management table 214 to "error".

Figure 9:
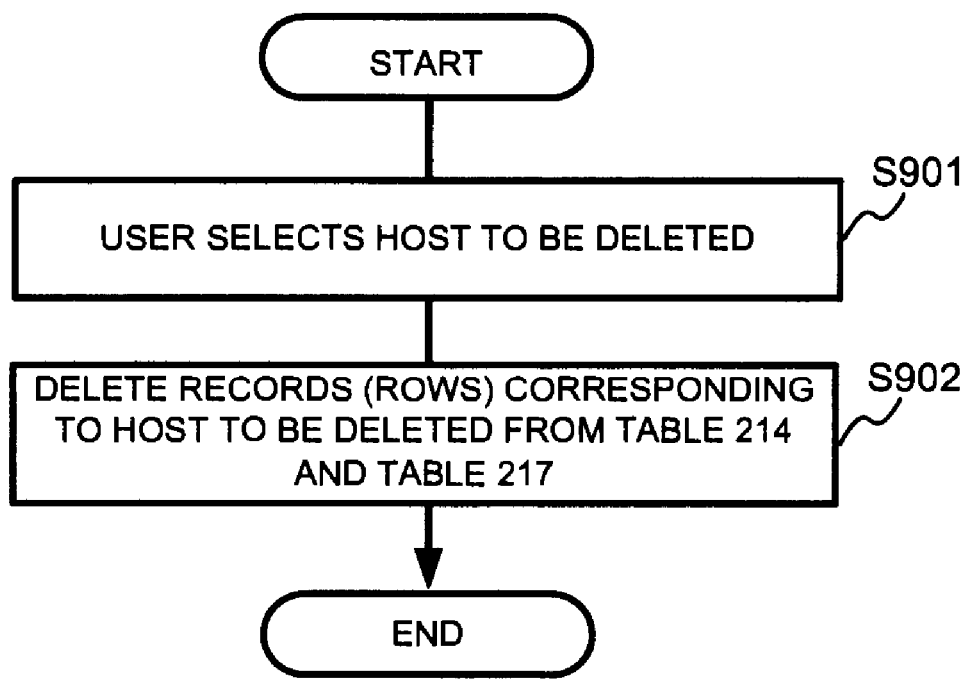
FIG. 9 is a flowchart of a host deletion process.

FIG. 9 is a flowchart of a host deletion process.

In S901, the integrated replication management software 211 receives a specification from the user for a host that is to be deleted (for example, receives an input of the name of the deletion-targeted host).

In S902, the software 211 deletes the record (row) related to the specified host from the host path management table 214 and the route table 217.

FIG. 10 is a flowchart of the storage path collection process.

The following three arguments are used in this process:
(1) Argument V (storage number of the request-destination storage);
(2) Argument R (route list); and
(3) Argument H (node ID of target host).

In S1001, the software 211 issues a table request specifying argument V and argument R via the target host, which corresponds to argument H. Consequently, the software 211 acquires the storage path table 242 from the storage corresponding to argument V. The software 211 updates the storage path management table 215 based on the information in this table 242. Specifically, of the table 242 information, the sending-side storage number, the receiving-side storage number, the line bandwidth, the amount of data, and the status are registered in the storage path table 242. Furthermore, in S1001, the argument V is the local storage that is directly connected to the target host. Therefore, the argument R is null in this S1001 (or comprises only the storage number of the local storage).

In S1002, the software 211 adds the argument V to the storage table 216.

In S1003, the software 211 adds the node ID (end-node ID) corresponding to the argument V, the argument R, and the argument H (start-node ID) to the route table 217.

In S1004, the software 211 records in the memory information denoting that the storage has visited the argument V.

In a case where the receiving-side storage number is registered in the acquired storage path table 242, S1005 through S1008 are carried out.

In S1005, the software 211 updates the argument V to the receiving-side storage number.

In S1006, the software 211 determines whether or not a visit was made to the storage corresponding to the post-update argument V. When the result of this determination is negative (S1006: NO), S1007 is carried out.

In S1007, the software 211 adds the post-update argument V to the argument R. Consequently, the post-update argument V is added at the tail end of a list of storage numbers that is described in the argument R.

In S1008, the software 211 sends a table request specifying the post-update argument V and the post-update argument R via the target host denoted by the argument H the same as in S1001. This table request reaches the storage corresponding to the argument V by way of the storages in the order that accords with this argument R. Then, the storage path table 242 of this storage reaches the management server 101 via the target host corresponding to the argument H by way of the storages in reverse order to the order that accords with the argument R. In a case where the receiving-side storage number is described in this storage path table 242, S1005 through S1008 are carried out. Furthermore, this S1008 is the recursive call of the processing of S1001.

According to this storage path table collection process, it is possible to acquire the storage path table 242 from all the storages in the storage cascade comprising the local storage that is directly connected to the target host in order from the storage nearest to the local storage. This process is carried out for all the added hosts in accordance with FIG. 7, and is carried out for all the hosts registered in the host path management table 214 in accordance with FIG. 8. That is, the software 211 acquires from any of the hosts the storage path tables 242 of all the storages inside the storage cascade comprising the local storage that is directly connected to this host.

Figure 12:
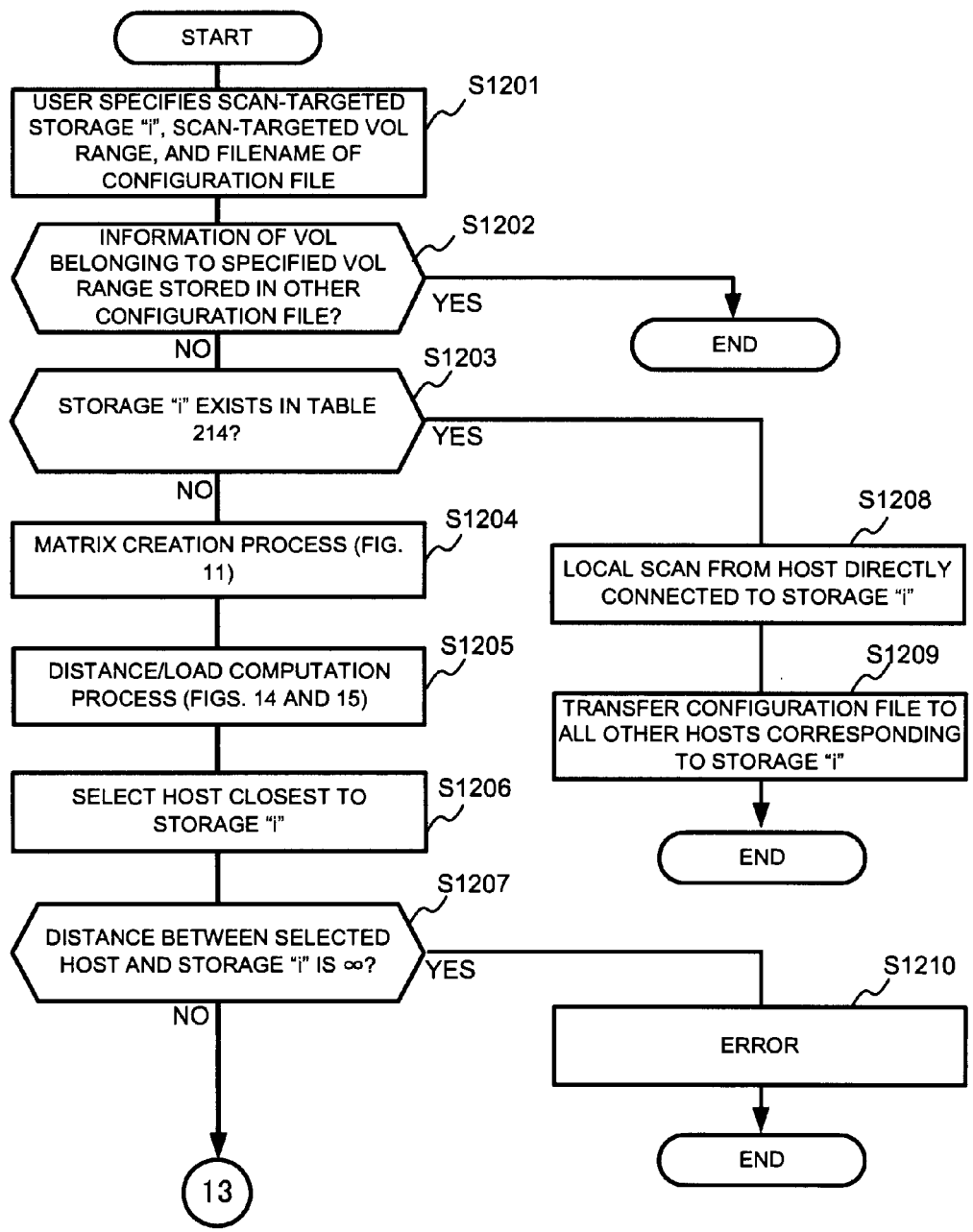
FIG. 12 is one part of a flowchart of a scan process.
Figure 13:
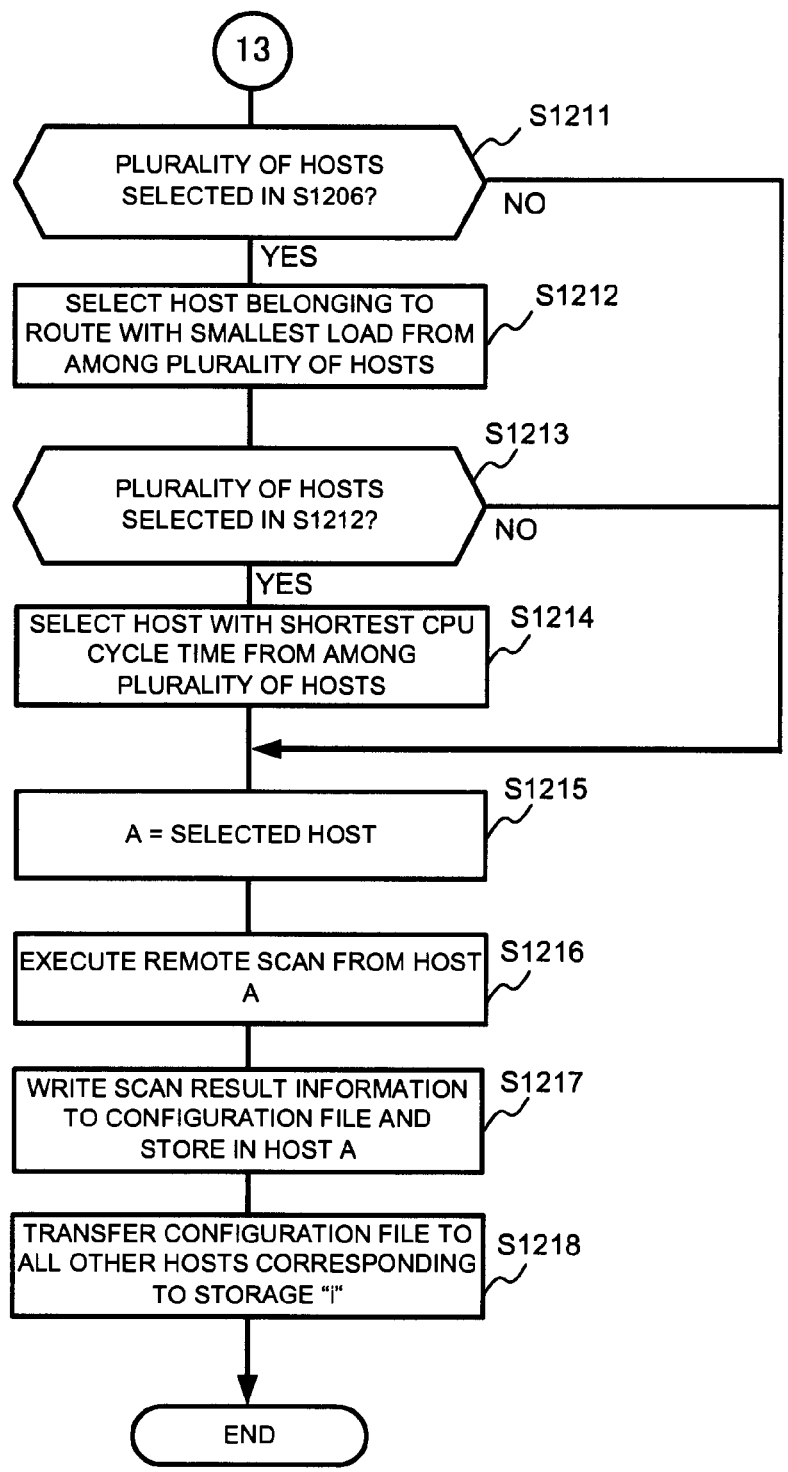
FIG. 13 is the remainder of the flowchart of the scan process.

FIGS. 12 and 13 are flowcharts of the scan process.

In S1201, the integrated replication management table 211 receives inputs of the following three information elements from the user:

(K1) The storage number of the scan-targeted storage;

(K2) A range of scan-targeted VOL (for example, a range of VOL numbers); and (K3) The file name of the configuration file of the scan result information reflection destination.

In S1202, the software 211 checks whether or not the information of the VOL belonging to the above-mentioned (K2) is stored in another configuration file. If the result of the determination of S1202 is affirmative (S1202: YES), the scan process ends. Conversely, if the result of the determination of S1202 is negative (S1202: NO), S1203 is carried out.

In S1203, the software 211 determines whether or not the above-mentioned (K1) has been registered in the host path management table 214, that is, determines whether or not the storage corresponding to the above-mentioned (K1) is the local storage.

If the result of the determination of S1203 is affirmative (S1203: YES), a local scan is performed. That is, the software 211 causes the host, which is connected to the local storage of the above-mentioned (K1), to send a local scan command comprising the above-mentioned (K1) and (K2) (S1208). Consequently, the software 211 acquires the scan result information related to the VOL that belongs to the above-mentioned (K2) from the local storage of the above-mentioned (K1) via the host, and stores this information in the configuration file of the above-mentioned (K3). The software 211 references the route table 217, specifies the other host (the host that is linked to this local storage via either one or a plurality of paths) corresponding to the local storage of the above-mentioned (K1), and transfers the configuration file of the above-mentioned (K3) to the specified other host (S1209).

Conversely, if the result of the determination of S1203 is negative (S1203: NO), a remote scan is performed. Specifically, the processing of S1204 through S1207, S1210, and S1211 through S1218 is carried out.

Figure 11:
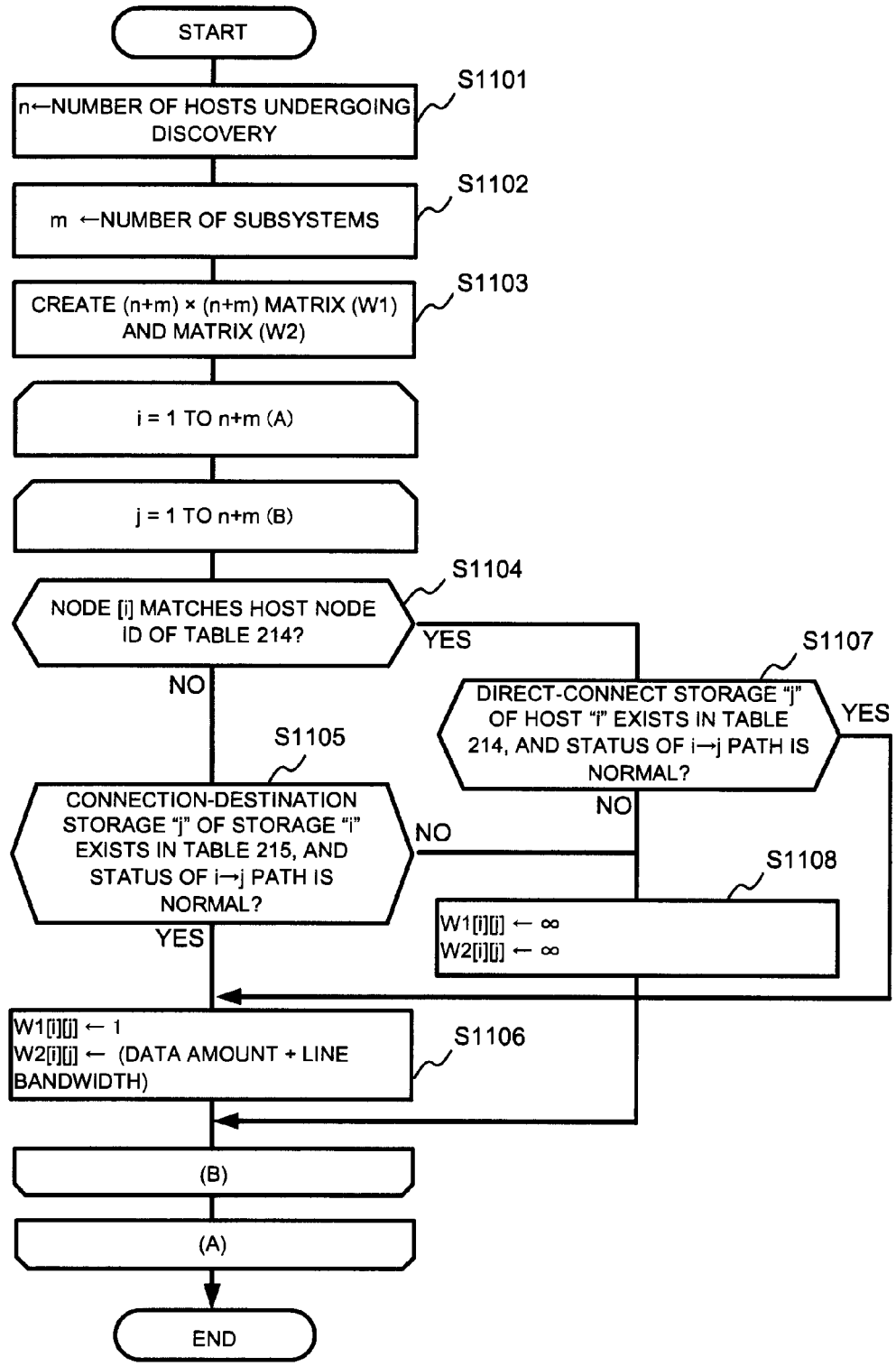
FIG. 11 is a flowchart of a matrix creation process.

In S1204, the software 211 creates the matrix (W1) 212 shown in FIG. 5A and the matrix (W2) 213 shown in FIG. 5B by performing the matrix creation process shown in FIG. 11.

Figure 14:
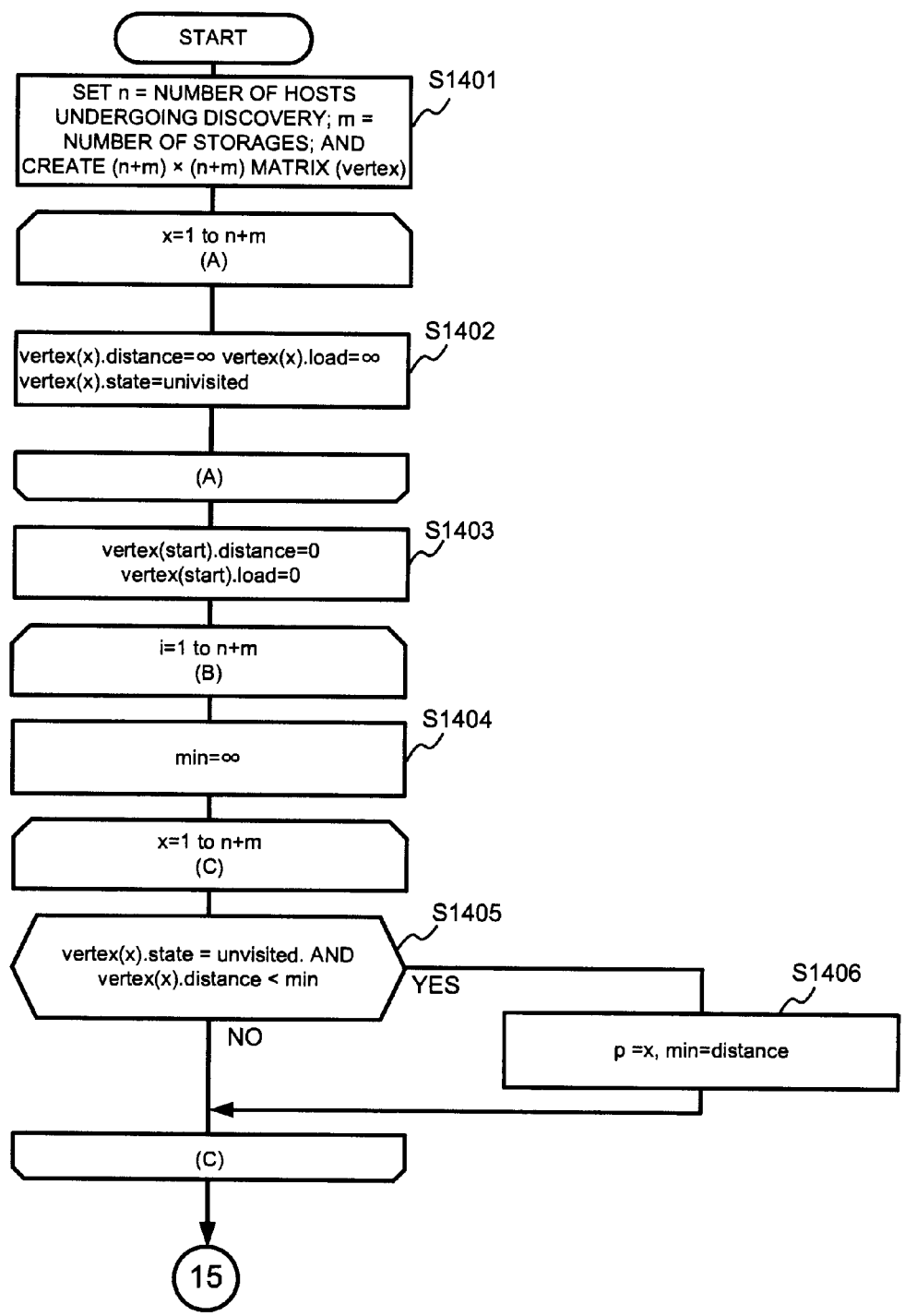
FIG. 14 is one part of a flowchart of a distance/load computation process.
Figure 15:
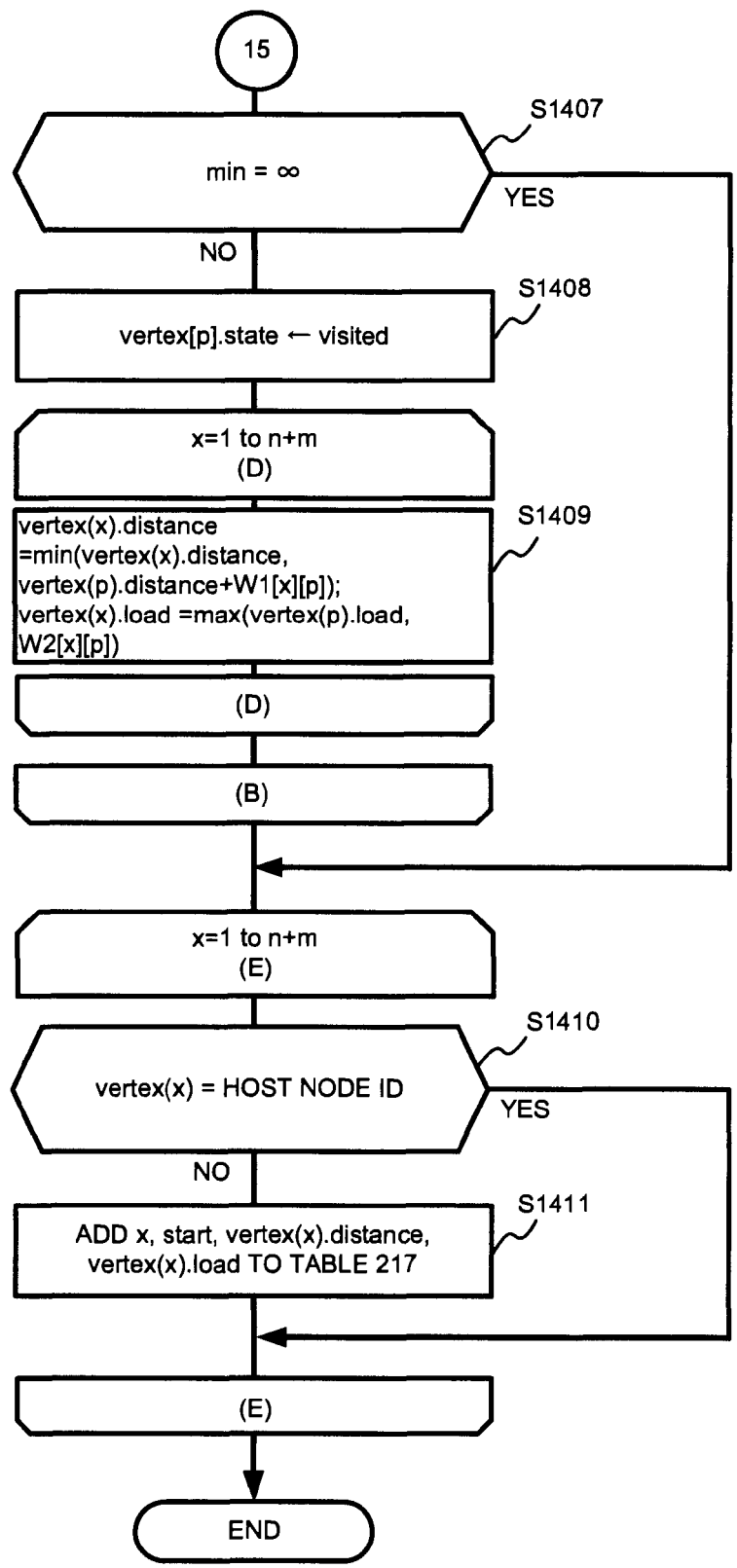
FIG. 15 is the remainder of the flowchart of the distance/load computation process.

In S1205, the software 211 computes the route distance and load by performing a distance/load computation process shown in FIGS. 14 and 15.

In S1206, the software 211 selects from the route table 217 the host with the shortest route distance to the storage of the above-mentioned (K1).

In S1207, on the basis of the route table 217 and the matrix (W1) 212 and/or the matrix (W2) 213, the software 211 determines whether or not there is a ∞ path in the route to the above-mentioned (K1) storage from the host selected in S1206. For example, if the status of any path (either a host path or a storage path) included in this route is "error", the value of the W1[i][j] and W2[i][j] for this path will be ∞. When the result of this determination is affirmative (S1207: YES), the software 211 performs a predetermined error process (S1210), and ends this scan process. Conversely, when the result of this determination is negative (S1207: NO), S1211 of FIG. 13 is carried out.

In S1211, the software 211 determines whether or not there is a plurality of shortest distance routes, that is, whether or not a plurality of hosts were selected in S1206. When the result of this determination is negative (S1211: NO), S1215 is carried out. Conversely, when the result of this determination is affirmative (S1211: YES), S1212 is carried out.

In S1212, the software 211 selects from among the plurality of hosts selected in S1206 the start-node host of the route having the smallest load.

In S1213, the software 211 determines whether or not there is a plurality of routes that have the shortest distance and the smallest load, that is, whether or not a plurality of hosts were selected in S1212. When the result of this determination is negative (S1213: NO), S1215 is carried out. Conversely, when the result of this determination is affirmative (S1213: YES), S1214 is carried out.

In S1214, the software 211 references the host path management table 214, and selects from among the plurality of hosts selected in S1212 the host having the shortest CPU cycle time.

In S1215, the software 211 sets as an argument A the information related to a single host selected in S1206, S1212 or S1214. Hereinafter, the host corresponding to the argument A will be called "host A".

In S1216, the software 211 causes host A to execute a remote scan. Specifically, for example, the software 211 causes the route list corresponding to the route from the host A to the above-mentioned (K1) storage and the remote scan command comprising the above-mentioned (K1) and (K2) to be sent from the host A. In accordance with this, the software 211 acquires the scan result information related to the VOL belonging to the above-mentioned (K2) from the above-mentioned (K1) local storage via the host A. The software 211 stores this information in the configuration file of the above-mentioned (K3), and stores this configuration file in the host A (S1217). The software 211 references the route table 217, specifies the other host (the host linked to this local storage via either one or a plurality of paths) corresponding to the local storage of the above-mentioned (K1), and transfers the above-mentioned (K3) configuration file to the specified other host (S1218).

FIG. 11 is a flowchart of the matrix creation process. This process is the processing of S1205 of FIG. 12.

In S1101, the software 211 sets the number of hosts undergoing discovery (number of host registered in the host path management table 214) as an argument n.

In S1102, the software 211 sets the number of storages registered in the storage table 216 as an argument m.

In S1103, the software 211 creates matrices (W1) and (W2) of a length n+m. At this stage, the matrices (W1) and (W2) both have a vertical axis [i] (i being an integer from 1 to (n+m)) and a horizontal axis [j] (j being an integer from 1 to (n+m)), but the cells where i and j intersect are blank.

S1104 through S1108 are carried out for all the combinations (patterns) of i and j.

In S1104, the software 211 determines whether or not the value of i, which was selected arbitrarily, matches any of the node IDs (host node IDs) registered in the host path management table 214. When the result of this determination is affirmative, S1107 is carried out (called host [i] in this case). Conversely, when the result of this determination is negative, S1105 is carried out (called storage [i] in this case).

In S1105, the software 211 references the storage path management table 215 and determines if there is a receiving-side storage [j] that corresponds to the sending-side storage [i], and whether or not the status of the storage path from the sending-side storage [i] to the receiving-side storage [j] is normal. When the result of this determination is affirmative, S1106 is carried out, and when the result of this determination is negative, S1108 is carried out.

In S1106, the software 211 sets W1[i][j]=1. That is, the software 211 sets "1" in a cell where the [i] and [j] of the matrix (W1) 212 intersect. Further, the software 211 sets W2[i][j]=(the data amount÷the line bandwidth). That is, the software 211 sets "(the data amount÷the line bandwidth)" in a cell where the [i] and [j] of the matrix (W2) 213 intersect. The data amount and the line bandwidth are both values corresponding to the path from the node [i] to the node [j].

In S1107, the software 211 references the host path management table 214 and determines if there is a local storage [j] that is directly connected to the host [i], and whether or not the status of the host path from the host [i] to the local storage [j] is normal. When the result of this determination is affirmative, S1106 is carried out, and when the result of this determination is negative, S1108 is carried out.

In S1108, the software 211 sets W1[i][j]=∞, and W2[i][j]=∞.

The matrix (W1) 212 shown in FIG. 5A and the matrix (W2) 213 shown in FIG. 5B are completed by S1104 through S1108 being carried out for all the combinations of i and j.

FIGS. 14 and 15 are flowcharts of the distance/load computation process. This process is the processing of S1205 of FIG. 12.

Before using the flowchart to explain the distance/weigh computation process, an overview of the distance/load computation process related to this embodiment will be explained.

If the node (storage, host) is considered as the vertex of the configuration (configuration of the system comprising the host and the storage) related to this embodiment, it is also possible to consider unconnected validation flags.

Each vertex has the fields "distance", "load" and "status". The distance denotes the vertex specified by an argument and the distance to this vertex. The load denotes the vertex specified by an argument and the load of the route to this vertex. The status denotes whether or not this vertex has been visited.

The initial value of both the distances and the loads for all the vertices is "∞", and the initial value for the status is unvisited. However, the distance and load of an argument-specified vertex are initialized to 0 (zero) because they are themselves.

In this process, a vertex p, which is unvisited and has the minimum distance, is selected, and the distances and loads of all the connection-related vertices from this vertex are computed. The distances and loads of all the vertices are computed by making each vertex become the vertex p using the (B) loop shown in FIGS. 14 and 15.

Figure 18:
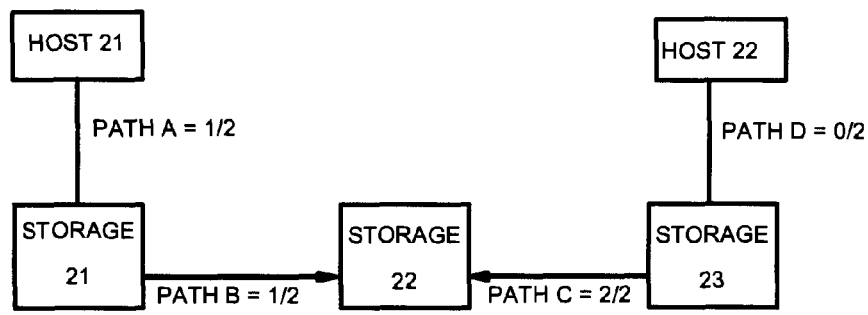
FIG. 18 is a schematic diagram of one example of a method for computing the load of a route.

In the example of a system configuration shown in FIG. 18, for example, since the distance of the route from the host 21 to the scan-targeted storage 22 has two paths A and B, this distance is "2" (hereinafter, this route will be expressed as "route AB"). Conversely, since the distance of the route from the host 22 to the scan-targeted storage 22 has two paths D and C, it becomes "2" (hereinafter, this route will be expressed as "route DC").

There is a plurality of methods, for example, the two types that follow, for defining the load of the route. The flowcharts of FIGS. 14 and 15 represent <Method 1>below.

<Method 1>

The maximum value of the loads (the data amount÷the line bandwidth) of the respective paths on the route is employed. According to this method, the load of route AB is the maximum value of the path A load "1/2" and the path B load "1/2" (max (1/2, 1/2))=1/2. Conversely, the load of the route DC is the maximum value of the path D load "0/2" and the path C load "2/2" (max(0/2, 2/2))=2/2.

<Method 2>

The average of the loads (the data amount÷the line bandwidth) of the respective paths on the route is employed. According to this method, the load of the route AB is the average of the path A load "1/2" and the path B load "1/2" (average of (1/2+1/2)÷2)=1/2. Conversely, the load of the route DC is the average of the path D load "0/2" and the path C load "2/2" (average (0/2+2/2)÷2)=1/2.

The distance/load computation process will be explained in detail below by referring to the FIGS. 14 and 15.

In S1401, the software 211 makes the following settings:

(1) Argument n=number of hosts undergoing discovery (number of hosts registered in the host path management table 214);

(2) Argument m=number of storages registered in the storage table 216; and (3) (n+m)×(n+m) matrix (vertex).

Here, (n+m) is the length (number) of objects having the fields "distance", "load" and "status".

S1402 is carried out for each integer from x=1 to (n+m). That is, the software 211 makes the following settings:

(1) vertex(x).distance=∞;

(2) vertex(x).load=∞; and (3) vertex(x).state=unvisited.

In S1403, the software 211 updates vertex(x).distance to 0 (zero), and similarly, updates vertex(x).load to 0 (zero).

The values [i] of the matrix (W1) 212 and the matrix (W2) 213 are integers from 1 to (n+m), and S1404 through S1409 are carried out from each integer.

In S1404, the software 211 sets "min=∞". Then, the software 211 carries out S1405 and S1406 for each integer from X=1 to (n+m). That is, in S1405, the software 211 determines whether or not "vertex(x).state=unvisited" and "vertex(x).distance<min". If the result of this determination is affirmative (S1405: YES), the software 211 sets "p=x" and "min=distance" in S1406. That is, the current value of x is set as the value of the variable p, and the current value of the distance is set as the variable min.

In S1407, the software 211 determines whether or not "min=∞". If the result of this determination is affirmative (S1407: YES), S1410 is carried out, and if the result of this determination is negative (S1407: NO), S1408 is carried out.

In S1408, the software 211 updates the value of vertex(x).state to "visited".

The software 211 carries out S1409 for each integer from x=1 to (n+m). That is, in S1409, the software 211 makes the following settings:

(1) vertex(x).distance=min(vertex(x).distance, vertex(p).distance+W1[x][p]);

(2) vertex(x).load=max(vertex(p).load, W2[x][p]). Furthermore, this has been an explanation of <Method 1> of the <Method 1> and <Method 2> cited above, and in a case where <Method 2> is employed, the vertex(x).load is "vertex(x).load=min (vertex(x).load, vertex(p).load+W2[x][p]).

The processing of the above S1404 through S1409 is carried out for each integer from i=1 to (n+m).

Thereafter, the software 211 carries out S1410 and S1411 for each integer from x=1 to (n+m). That is, in S1410, the software 211 determines whether or not the value of the vertex(x) matches the node ID of the host. If the result of this determination is negative (S1410: NO), the software 211 registers x, start, vertex(x).distance and vertex(x).load in the route table 217 in S1411.

According to the embodiment described hereinabove, prior to the scan process, the management server 101 discerns the configurations of all the routes that exist in the computer system comprising the hosts 1 and 2 and the storage cascade (storages 1 through 4) (specifically, the route table 217 is constructed). Then, in the scan process, the management server 101 references the route table 217, and selects the start-node host of the optimum route from among the plurality of routes for which the scan-targeted remote storage is the end node. The optimum route, as described hereinabove, for example, is the shortest route and the minimum-load route. Consequently, the probability of being able to select the optimum host computer to which to issue the remote scan command is enhanced.

Figure 19:
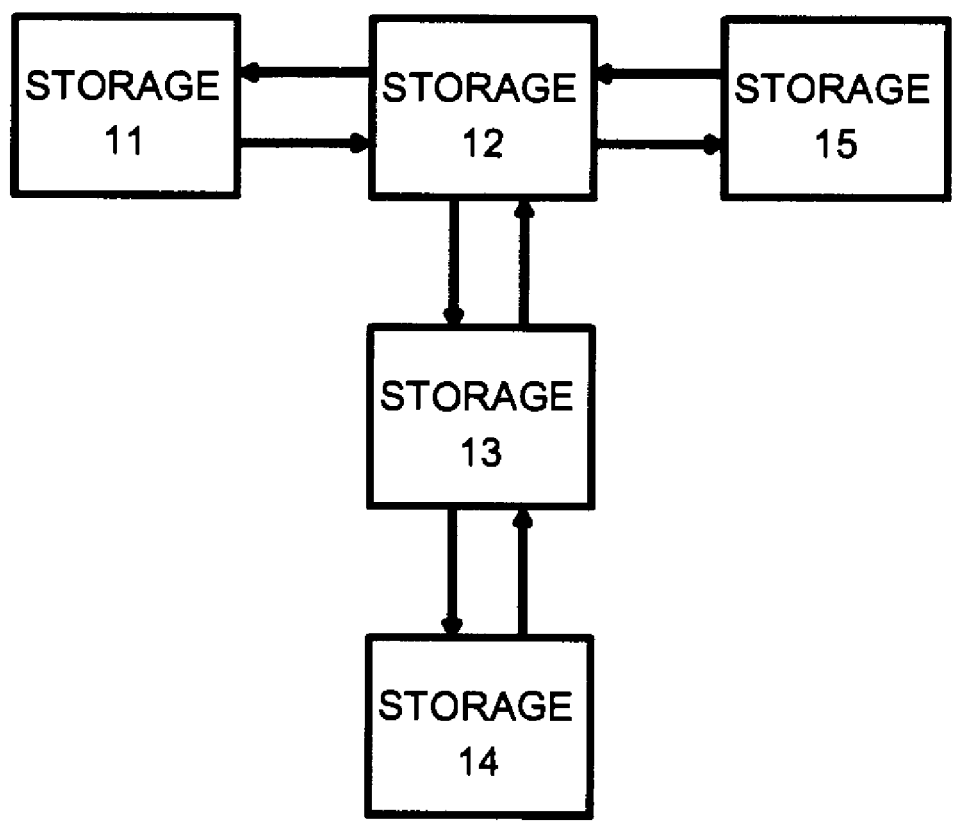
FIG. 19 shows a variation of the lineup of the plurality of storage systems connected in series.

One embodiment of the present invention has been explained above, but the present invention is not limited to this embodiment, and it goes without saying that various changes are possible within the scope of the present invention without departing from the gist thereof. For example, the number of hosts, storages, and storage cascades is not limited to the above-described examples. Further, "a plurality of storage systems that are connected in series" does not always have to be a storage cascade of one row. For example, as shown in FIG. 19, a plurality of storage cascades (for example, a cascade of storages 11, 12 and 15, a cascade of storages 11, 12, 13 and 14, and a cascade of storages 15, 12, 13 and 14) may also be included by branching off along the way.

What is claimed is:

1. A computer comprising:
a network interface for communicating via a communication network;
a storage resource; and
a processor, which is connected to the network interface and to the storage resource,
wherein a plurality of host computers are connected to the communication network,
a plurality of storage systems configure one or more storage cascades,
a single storage cascade is configured from two or more storage systems connected in series,
two or more local storages and one or more remote storages are included in the plurality of storage systems,
the local storage is a storage system that is connected to at least one host computer, and
the remote storage is a storage system that is not connected to any of the host computers,
and wherein the processor executes a route check process and a scan process,
(A) the route check process comprising:
(a1) a process for acquiring, via the network interface, host/storage connection information related to a host path, which is the path connecting the host computer to the local storage;
(a2) a process for acquiring, via the network interface, storage/storage connection information related to a storage path, which is the path connecting a storage system to a storage system; and
(a3) a process for creating route management information based on the host/storage connection information acquired in the (a1) and the storage/storage connection information acquired in the (a2), and storing the created route management information in the storage resource,
the route management information is information related to a plurality of routes,
a single route is configured from two or more nodes connected in series and an inter-node path, a start node of these two or more nodes is any of the host computers, and the other node of these two or more nodes is any of the storage systems,
(B) the scan process comprising:
(b1) a process for specifying, from the route management information, a plurality of routes having a scan-targeted storage system of the plurality of storage systems as an end node; and
(b2) a process for selecting, based on the route management information, the host computer, which is the start node of an optimum route from among the plurality of routes, as the host computer for executing a remote scan of acquiring information related to a scan-targeted logical volume from a scan-targeted remote storage in a case where it is found in the process (b1) that the scan-targeted storage system is any of the remote storages.

2. The computer according to claim 1, wherein each storage system has a first command device and a second command device,
a first direction storage path and a second direction storage path exist as the storage paths connecting the storage systems,
the first direction storage path is the path from the first command device inside the one storage system to the first command device inside the other storage system,
the second direction storage path is the path from the second command device inside the other storage system to the second command device inside the one storage system, each command device is a logical volume in which a command is stored, the optimum route is the shortest route having the least number of storage systems existing between the scan-targeted remote storage and the host computer which is the start node, a scan command specifying a transfer order in accordance with the optimum route and the scan-targeted logical volume is issued from the host computer that has received the command to execute the remote scan via the optimum route, and this scan command is received by the local storage connected to this host computer, stored in command device in accordance with the transfer order of the first and second command devices of this local storage, and transferred between the command devices via the storage path of the direction that accords with this transfer order, and as a result is stored in the command device inside the scan-targeted remote storage, in response to the scan command stored in the scan-targeted remote storage, scan result information related to the scan-targeted logical volume specified in this scan command is sent from this remote storage, and this scan result information is transferred in the reverse order of the transfer order and received by the host computer that has issued the scan command, and the processor sends the scan result information to the host computer which is the start node of a route other than the shortest route from among the plurality of routes having the scan-targeted remote storage as the end node.

3. The computer according to claim 2, wherein the host-storage connection information comprises information denoting the bandwidth and the data transfer amount per unit of time for the host path, the storage/storage connection information comprises information denoting the bandwidth and data transfer amount per unit of time for the first and second direction storage paths, the processor carries out the following processes (b21) and (b22) during the process (b2):

(b21) a process for computing the load of each inter-node path based on the bandwidth and the data transfer amount denoted by the host/storage connection information and the bandwidth and the data transfer amount denoted by the storage/storage connection information, and computing the load of the respective routes based on the load of each inter-node path; and (b22) a process for, in a case where there are two or more optimum routes, selecting the host computer being the start node of the minimum load route, which is the route having the smallest load, from among the two or more host computers belonging to the two or more shortest routes.

4. The computer according to claim 3, wherein the host/storage connection information comprises information denoting CPU performance of the host computer, and the processor also carries out the following process (b23) during the process (b2):

(b23) a process for, in a case where there are two or more minimum load routes, selecting the host computer having the highest CPU performance of the two or more host computers belonging to the two or more minimum load routes.

5. The computer according to claim 1, wherein the optimum route is the route selected based on at least one of a route distance, a route load, and a node load, the route distance is the number of storage systems that exist between the start node and the end node, and the route load is the load defined on the basis of the load of each path of this route.

6. The computer according to claim 5, wherein the optimum route is the shortest route, and the shortest route is the route with the least number of storage systems existing between the scan-targeted remote storage and the host computer which is the start node.

7. The computer according to claim 6, wherein the host/storage connection information comprises information denoting the load of the host path, the storage/storage connection comprises information denoting the load of the storage path, the processor computes the load of each route based on the load of each inter-node path denoted by the host-storage connection information and the storage/storage connection information, and in a case where there are two or more shortest routes, the optimum route is the minimum load route, which is the route having the smallest load of the two or more shortest routes.

8. The computer according to claim 7, wherein in a case where there are two or more minimum load routes, the optimum route is the route with the smallest load relating to the node from among the two or more minimum load routes.

9. The computer according to claim 8, wherein the host computer with the smallest load of the two or more host computers belonging to the two or more minimum load routes is selected.

10. The computer according to claim 5, wherein the host/storage connection information comprises information denoting the load of the host path, the storage/storage connection comprises information denoting the load of the storage path, the processor computes the load of each route based on the load of each inter-node path denoted by the host/storage connection information and the storage/storage connection information, and the optimum route is the minimum load route, which is the route having the smallest load.

11. The computer according to claim 5, wherein the selected host computer is the start node of the route having the smallest load relating to the node.

12. The computer according to claim 1, wherein a scan command specifying a transfer order in accordance with the optimum route and the scan-targeted logical volume is issued from the host computer that has received the command to execute the remote scan via the optimum route, and this scan command is received by the local storage connected to this host computer, transferred in accordance with the transfer order specified in this scan command, and received by the scan-targeted remote storage, in response to this scan command, scan result information related to the scan-targeted logical volume specified in this scan command is sent from the scan-targeted remote storage, and this scan result information is transferred in the reverse order of the transfer order and received by the host computer that has issued the scan command, and the processor sends the scan result information to the host computer which is the start node of a route other than the optimum route from among the plurality of routes having the scan-targeted remote storage as the end node.

13. The computer according to claim 5, wherein the optimum route is the route selected on the basis of at least two of a route distance difference, a route load difference, and a node load difference.

14. A scanning method for causing a host computer to acquire information related to a scan-targeted logical volume from any of a plurality of storage systems configuring one or more storage cascades,
- wherein a single storage cascade is configured from two or more storage systems connected in series,
- two or more local storages and one or more remote storages are included in the plurality of storage systems,
- the local storage is a storage system that is connected to at least one host computer, and
- the remote storage is a storage system that is not connected to any of the host computers,
- and wherein the scanning method executes a route check process and a scan process,
- (A) the route check process comprising:
- (a1) a process for acquiring, via a network interface, host/storage connection information related to a host path, which is the path connecting the host computer to the local storage;
- (a2) a process for acquiring, via the network interface, storage/storage connection information related to a storage path, which is the path connecting a storage system to a storage system; and
- (a3) a process for creating route management information based on the host/storage connection information acquired in the (a1) and the storage/storage connection information acquired in the (a2), and storing the created route management information in a storage resource,
- the route management information is information related to a plurality of routes,
- a single route is configured from two or more nodes connected in series and an inter-node path, a start node of these two or more nodes is any of the host computers, and the other node of these two or more nodes is any of the storage systems,
- (B) the scan process comprising:
- (b1) a process for specifying, from the route management information, a plurality of routes having a scan-targeted storage system of the plurality of storage systems as an end node; and
- (b2) a process for selecting, based on the route management information, the host computer, which is the start node of an optimum route from among the plurality of routes, as the host computer for executing a remote scan of acquiring information related to a scan-targeted logical volume from a scan-targeted remote storage in a case where it is found in the process (b1) that the scan-targeted storage system is any of the remote storages.

15. A non-transitory computer readable medium storing a computer program for causing a host computer to acquire information related to a scan-targeted logical volume from any of a plurality of storage systems configuring one or more storage cascades,
- wherein a single storage cascade is configured from two or more storage systems connected in series,
- two or more local storages and one or more remote storages are included in the plurality of storage systems,
- the local storage is a storage system that is connected to at least one host computer, and
- the remote storage is a storage system that is not connected to any of the host computers,
- and wherein the computer program causes a computer to execute a route check process and a scan process,
- (A) the route check process comprising:
- (a1) a process for acquiring, via a network interface, host/storage connection information related to a host path, which is the path connecting the host computer to the local storage;
- (a2) a process for acquiring, via the network interface, storage/storage connection information related to a storage path connecting a storage system to a storage system; and
- (a3) a process for creating route management information based on the host/storage connection information acquired in the (a1) and the storage/storage connection information acquired in the (a2), and storing the created route management information in a storage resource,
- the route management information is information related to a plurality of routes,
- a single route is configured from two or more nodes connected in series and an inter-node path, a start node of these two or more nodes is any of the host computers, and the other node of these two or more nodes is any of the storage systems,
- (B) the scan process comprising:
- (b1) a process for specifying, from the route management information, a plurality of routes having a scan-targeted storage system of the plurality of storage systems as an end node; and
- (b2) a process for selecting, based on the route management information, the host computer, which is the start node of an optimum route from among the plurality of routes, as the host computer for executing a remote scan of acquiring information related to a scan-targeted logical volume from a scan-targeted remote storage in a case where it is found in the process (b1) that the scan-targeted storage system is any of the remote storages.

* * * * *